(12) United States Patent
Chen et al.

(10) Patent No.: US 12,038,771 B2
(45) Date of Patent: Jul. 16, 2024

(54) PRESSURE REGULATOR AND GAS STORAGE DEVICE WITH THE SAME

(71) Applicant: BANZA STAMPING INDUSTRY CORP., Suao Township, Yilan County (TW)

(72) Inventors: Li-Wei Chen, Suao Township, Yilan County (TW); Shen-Kai Ho, Suao Township, Yilan County (TW); Tsang-Yao Lu, Suao Township, Yilan County (TW)

(73) Assignee: BANZA STAMPING INDUSTRY CORP., Suao Township, Yilan County (TW)

( * ) Notice: Subject to any disclaimer, the term of this patent is extended or adjusted under 35 U.S.C. 154(b) by 0 days.

(21) Appl. No.: 18/131,104

(22) Filed: Apr. 5, 2023

(65) Prior Publication Data

US 2023/0244252 A1    Aug. 3, 2023

Related U.S. Application Data

(62) Division of application No. 17/001,058, filed on Aug. 24, 2020, now Pat. No. 11,669,112.

(30) Foreign Application Priority Data

May 18, 2020    (TW) .................................. 109116447

(51) Int. Cl.
*G05D 16/10*    (2006.01)
*F17C 13/04*    (2006.01)
*G05D 16/04*    (2006.01)

(52) U.S. Cl.
CPC .......... *G05D 16/109* (2019.01); *F17C 13/04* (2013.01); *F17C 2205/0338* (2013.01); *G05D 16/0402* (2019.01); *Y10T 137/7795* (2015.04)

(58) Field of Classification Search
CPC ......... Y10T 137/7795; Y10T 137/7796; Y10T 137/7782; G05D 16/109; G05D 16/0402;
(Continued)

(56) References Cited

U.S. PATENT DOCUMENTS 3,111,946 A    11/1963   Galeazzi
6,360,546 B1 *  3/2002   Wang .................... F17C 13/025
                                                         62/48.1

(Continued)

FOREIGN PATENT DOCUMENTS

CN    207514319 U    6/2018

*Primary Examiner* — Jessica Cahill
(74) *Attorney, Agent, or Firm* — Muncy, Geissler, Olds & Lowe, P.C.

(57) ABSTRACT

A pressure regulator has a valve tube assembly, a gas-input assembly, a first regulating assembly and a second regulating assembly. The gas storage device has a storage unit and the pressure regulator. By the first and the second regulating assemblies, the effect of adjusting down the gas pressure is achieved to maintain the safety of use. The pressure regulator is partially embedded in the gas storage unit to reduce the overall volume of the gas storage device. However, the high-pressure piston chamber of the valve tube assembly communicates with the outside of the gas storage unit through the high-pressure gas channel to maintain the normal operation of the elastic element in the high-pressure piston chamber.

11 Claims, 20 Drawing Sheets

(58) Field of Classification Search
CPC .. G05D 16/10; F17C 2205/0338; F17C 13/04
See application file for complete search history.

(56) References Cited

U.S. PATENT DOCUMENTS

| | | |
|---|---|---|
| 7,334,598 B1 | 2/2008 | Hollars |
| 9,310,812 B2 | 4/2016 | Costle |
| 10,655,786 B1 | 5/2020 | Dean |
| 2002/0014227 A1* | 2/2002 | Girouard ............. G05D 7/0635 |
| | | 123/527 |
| 2002/0153057 A1* | 10/2002 | Nagel ..................... F16K 1/306 |
| | | 141/346 |
| 2003/0213521 A1* | 11/2003 | Downie .................. F17C 13/04 |
| | | 137/505.33 |
| 2006/0157122 A1 | 7/2006 | Kawamura |
| 2007/0017524 A1 | 1/2007 | Wilson, Jr. |
| 2009/0163359 A1* | 6/2009 | Kanazawa ........... B01J 20/0207 |
| | | 502/400 |
| 2010/0276614 A1 | 11/2010 | Patterson |
| 2011/0155267 A1* | 6/2011 | Nicolini ................. F17C 13/04 |
| | | 137/511 |
| 2012/0181287 A1 | 7/2012 | Holbeche |
| 2016/0215890 A1* | 7/2016 | Muzzo ................... F16K 1/306 |

* cited by examiner

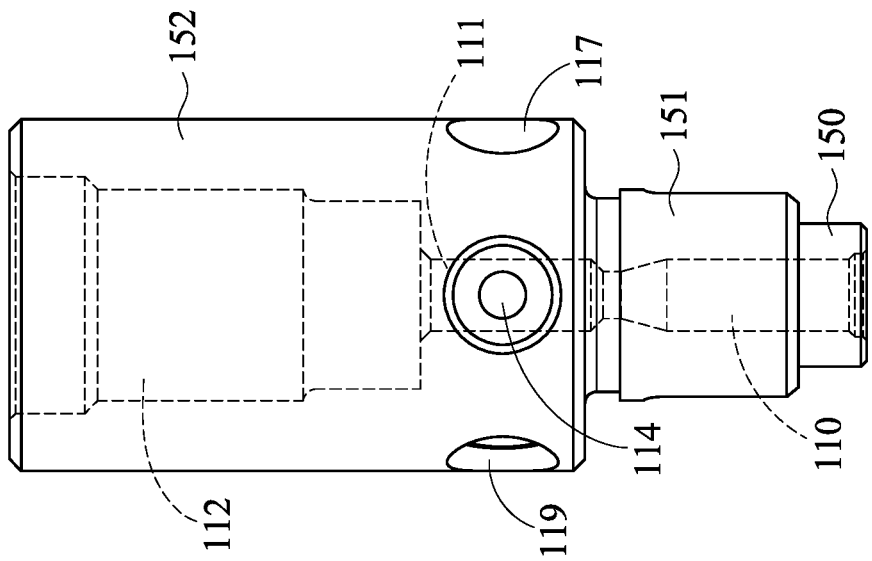
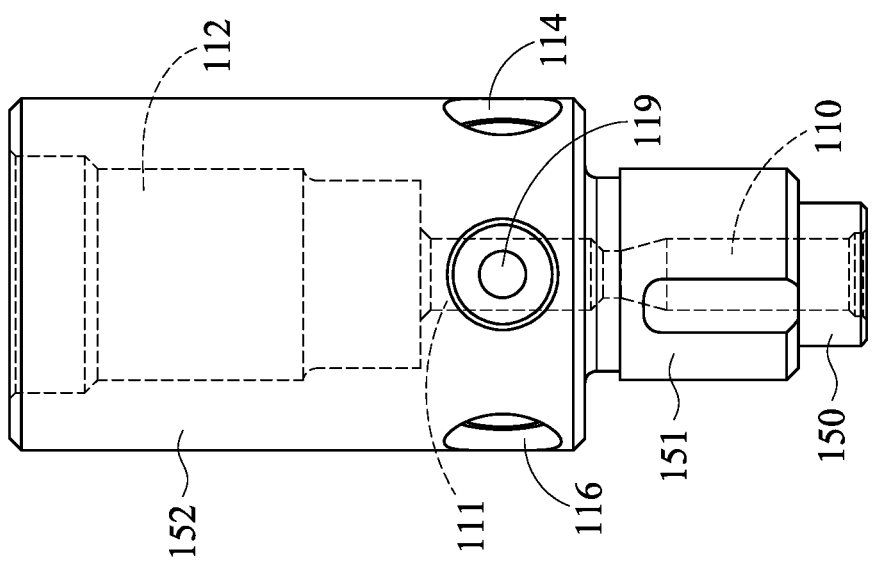

PRESSURE REGULATOR AND GAS STORAGE DEVICE WITH THE SAME

CROSS-REFERENCE TO RELATED APPLICATIONS

This application is a divisional application of U.S. patent application filed on Aug. 24, 2020 and having application Ser. No. 17/001,058, the entire contents of which are hereby incorporated herein by reference.

This application is based upon and claims priority under 35 U.S.C. 119 from Taiwan Patent Application No. 109116447 filed on May 18, 2020, which is hereby specifically incorporated herein by this reference thereto.

BACKGROUND OF THE INVENTION

1. Field of the Invention

The present invention relates to a pressure regulator, and more particularly to a pressure regulator applicable for a high-pressure gas storage unit.

2. Description of the Prior Arts

A conventional pressure regulator is commonly adopted to reduce a gas pressure from a high pressure source to a usable level required by a gas output end. Nowadays, the conventional pressure regulators are comprehensively applied in various kinds of the apparatuses. The conventional pressure regulator has a regulating assembly to selectively intercept a gas flow from the high pressure source to the gas output end. When a pressure of the gas output end reaches to a predetermined value, the regulating assembly would be able to shut down the gas flow and maintain the pressure value that is required at the gas output end. As to the condition that the pressure difference is relatively higher between the high pressure source and the gas output end, some of the conventional pressure regulators would provide the multi-level regulating devices in consideration of the safety and the precision of the pressure adjustment. In other words, the conventional pressure regulators would be equipped with multiple sets of the regulating assemblies to reduce the gas pressure down to a required level in sequence by different sets of the regulating assemblies.

However, using more sets of the regulating assemblies would inevitably make the overall volume of the conventional pressure regulator enlarged. When it refers to an application for a mobile high pressure source (such as a gas storage unit of an air gun), the enlarged volume caused by the multi-level regulating assemblies would make the overall volume of the mobile high pressure source increased as well. It is the drawback for the users to carry the enlarged mobile high pressure source inconveniently.

SUMMARY OF THE INVENTION

To overcome the shortcomings, the present invention provides a pressure regulator and gas storage device with the same to mitigate or to obviate the aforementioned problems.

A pressure regulator has a valve tube assembly, a gas-input assembly, a first regulating assembly and a second regulating assembly. The gas storage device has a storage unit and the pressure regulator. By the first and the second regulating assemblies, the effect of adjusting down the gas pressure is achieved to maintain the safety of use. The pressure regulator is partially embedded in the gas storage unit to reduce the overall volume of the gas storage device. However, the high-pressure piston chamber of the valve tube assembly communicates with the outside of the gas storage unit through the high-pressure gas channel to maintain the normal operation of the elastic element in the high-pressure piston chamber.

Other objectives, advantages and novel features of the invention will become more apparent from the following detailed description when taken in conjunction with the accompanying drawings.

BRIEF DESCRIPTION OF THE DRAWINGS

FIG. 6A to 6E are multiple lateral views of an external tube of a pressure regulator in accordance with the present invention;

DETAILED DESCRIPTION OF THE EMBODIMENTS

Figure 1:
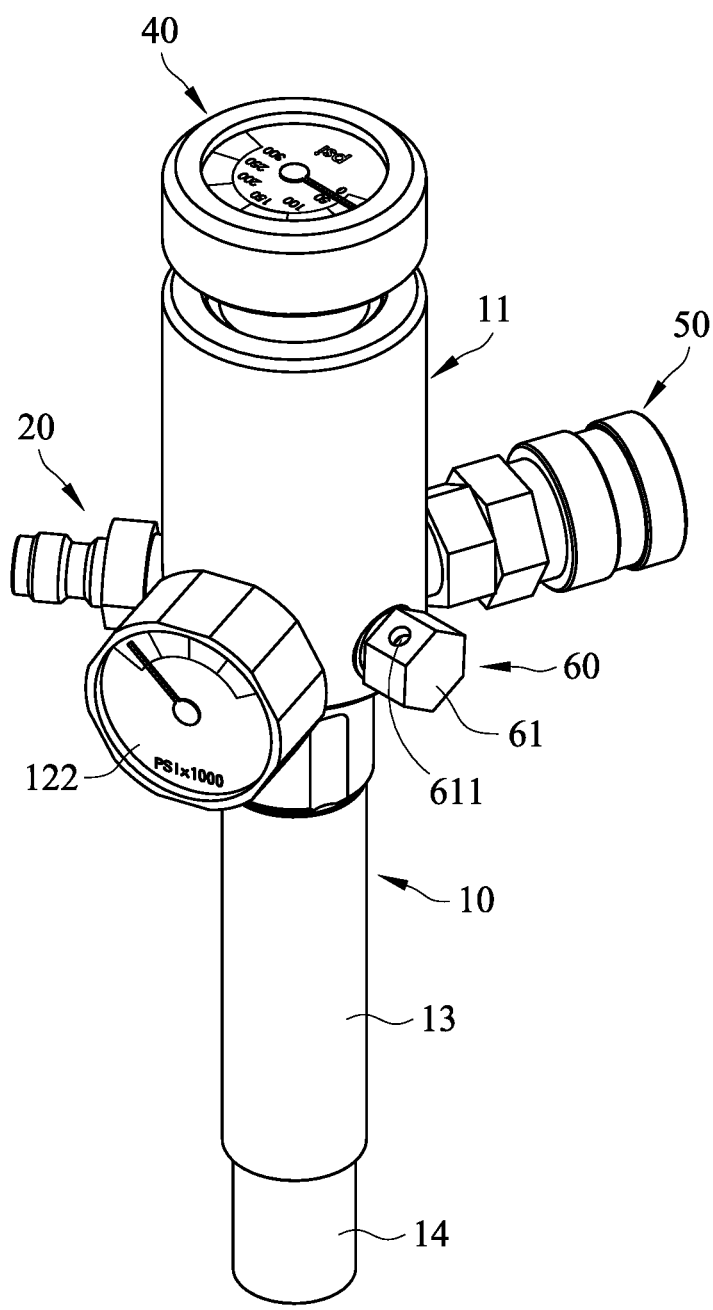
FIG. 1 is a perspective view of a pressure regulator in accordance with the present invention.

With reference to the attached drawings, the present invention is described by the embodiments below where the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, nor with the actual ratio. Some of the dimensions or dimension ratios have been enlarged or simplified to provide a better illustration. The actual numbers, actual shapes, or actual dimensions ratios can be selectively designed and disposed and the detail component layouts may be more complicated.

With reference to FIGS. 1 to 4, a pressure regulator 1 in accordance with the present invention comprises a valve tube assembly 10, a gas-input assembly 20, a first regulating assembly 30, a second regulating assembly 40, and a gas-output assembly 50.

Figure 4:
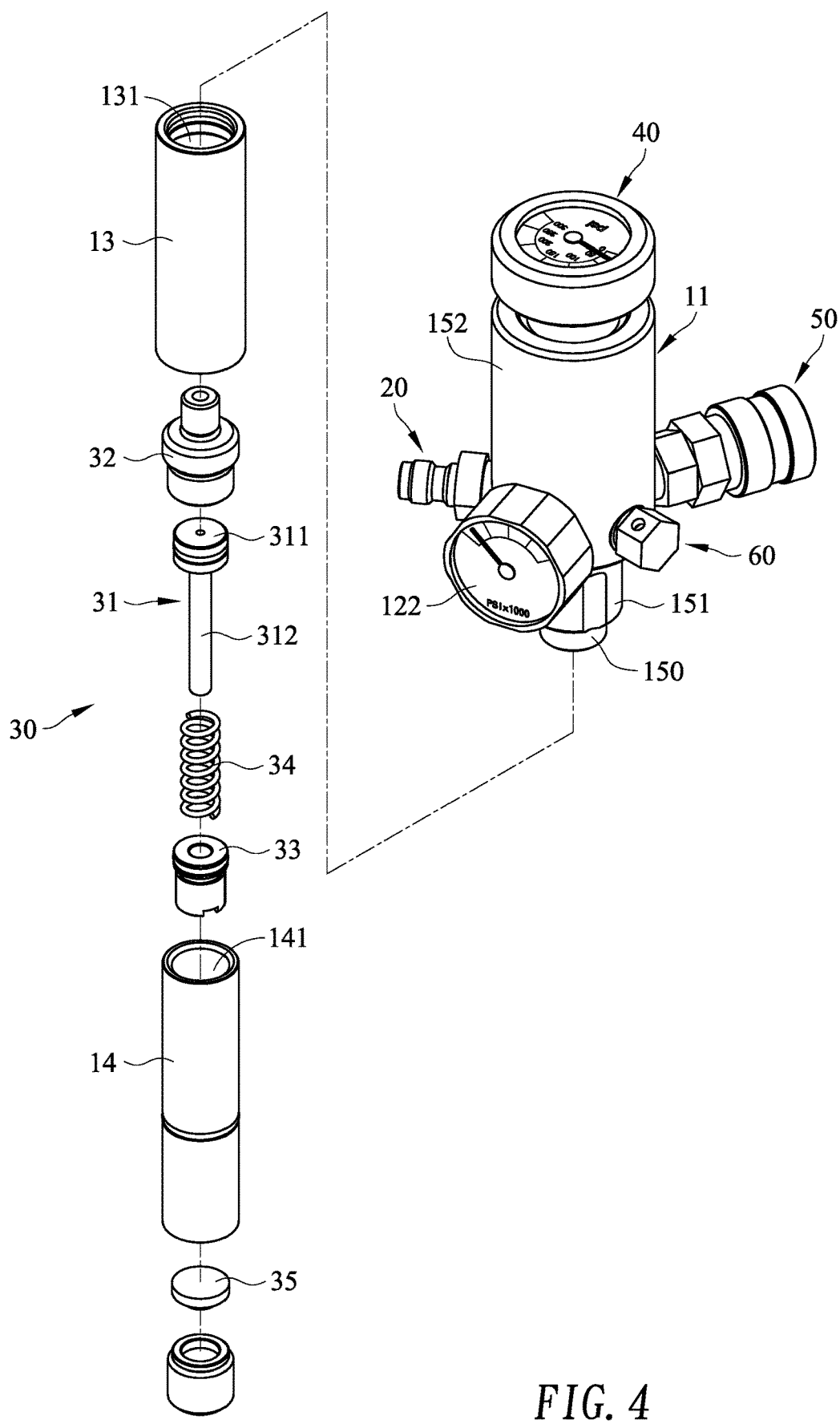
FIG. 4 is an exploded view of an illustrated part of a pressure regulator in accordance with the present invention.

With reference to FIG. 4, the valve tube assembly 10 has an external tube 11, a first internal tube 13 and a second internal tube 14.

With reference to FIGS. 5 and 6A to 6E, the external tube 11 has an axial channel. The axial channel has an intermediate chamber 110, a low-pressure chamber 111 and a low-pressure piston chamber 112 arranged in sequence. In an embodiment, the external tube 11 has an intermediate section 150, a low-pressure section 151 and an extension section 152, wherein the low-pressure section 151 connects the intermediate section 150 and the extension section 152. The exterior diameters of the external tube 11 are grown wider from the intermediate section 150 to the extension section 152, so that the connecting portions of the adjacent sections are formed as a stepped surface. As a result, an end surface 161, an intermediate surface 162 and a shoulder 163 are formed sequentially. The end surface 161 is disposed at an end of the intermediate section 150. The intermediate chamber 110 is disposed within the intermediate section 150 and the low-pressure section 151. The low-pressure chamber 111 as well as the low-pressure piston chamber 112 are disposed within the extension section 152. The external tube 11 has a gas inlet orifice 113 and a gas outlet orifice 114 formed transversely through the external tube 11. The gas inlet orifice 113 communicates with a gas-input channel 115 which is disposed axially in the external tube 11. The gas-input channel 115 has a first opening and a second opening. The first opening is formed through the intermediate surface 162. The second opening communicates with the gas inlet orifice 113. In an embodiment, a test orifice 116 and an anti-explosion orifice 117 are disposed adjacent to the gas inlet orifice 113 transversely. The test orifice 116 communicates with the gas inlet orifice 113 throughout the gas-input channel 115. The anti-explosion orifice 117 communicates with the gas inlet orifice 113 throughout an anti-explosion channel 118. The gas outlet orifice 114 communicates with the low-pressure chamber 111. In an embodiment, the external tube 11 has a gas releasing orifice 119 communicating with the low-pressure chamber 111. The external tube 11 has a high-pressure exhaustion channel 120 having an axial part and a radial part, the axial part of the high-pressure exhaustion channel 120 has a first opening formed through the end surface 161 of the external tube 11 while the radial part of the high-pressure exhaustion channel 120 has a second opening formed through the extension section 152. When a gas storage unit 90 is connected, the radial part of the high-pressure exhaustion channel 120 formed through the extension section 152 is disposed outside the gas storage unit 90. The external tube 11 further has a low-pressure exhaustion channel 121 which is formed transversely through the external tube 11 and communicates with the low-pressure piston chamber 112.

Figure 7:
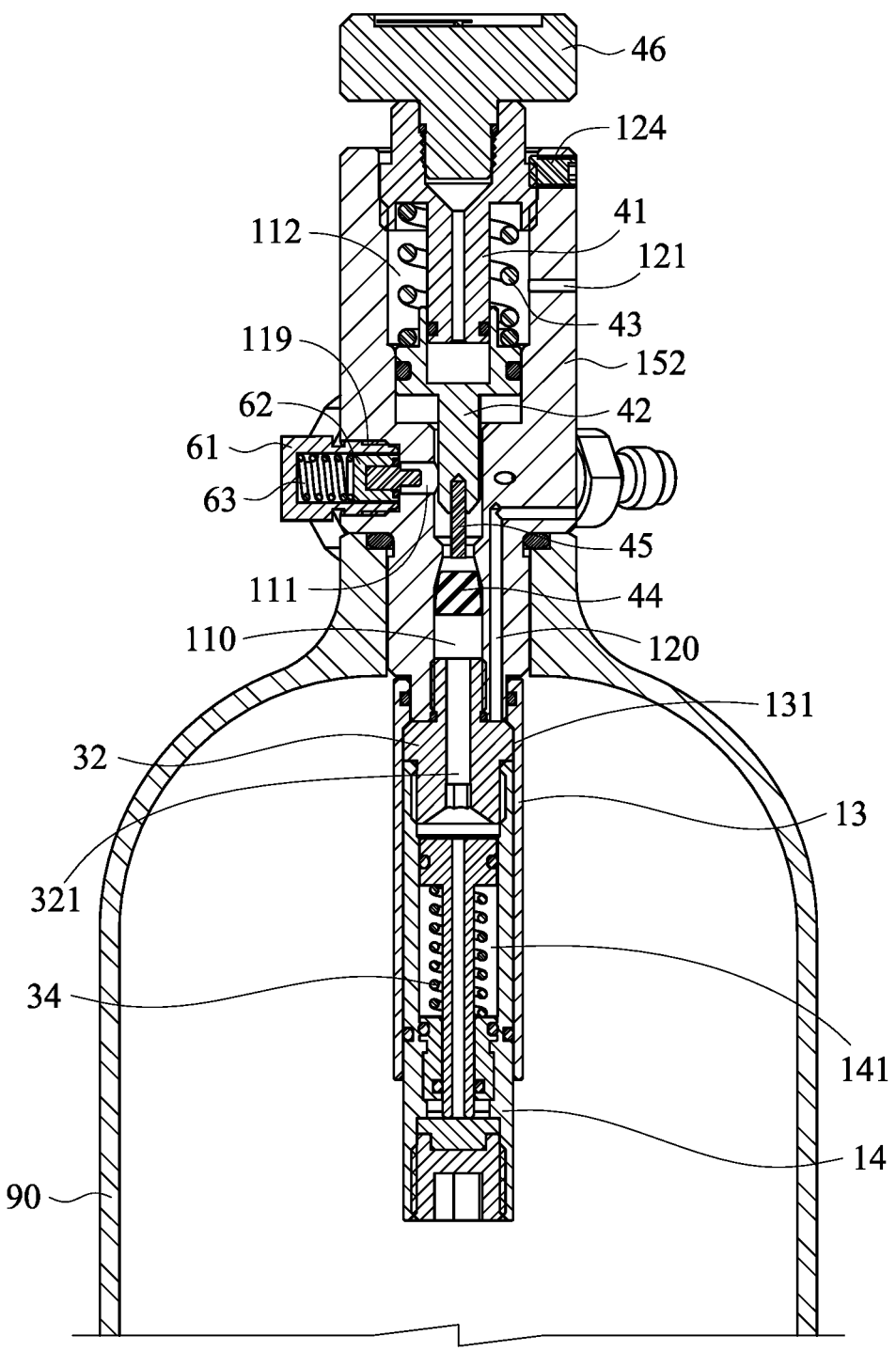
FIG. 7 is a cross sectional view from a first lateral side of a gas storage device showing an internal action of the gas storage device in accordance with the present invention.
Figure 8:
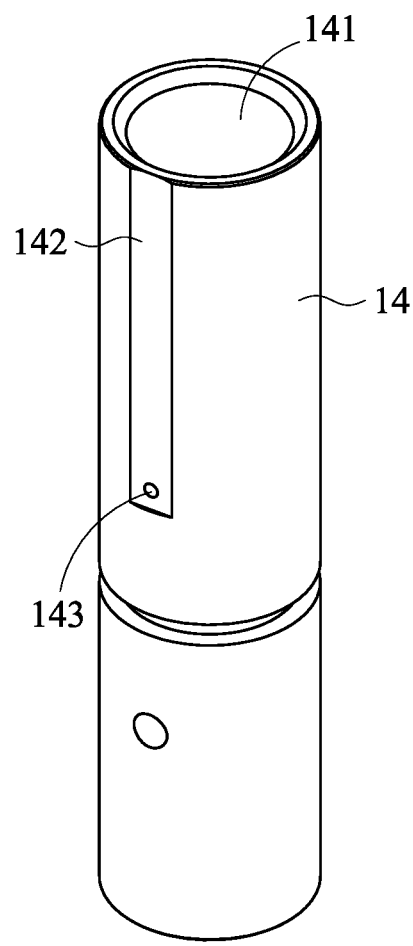
FIG. 8 is a perspective view of a second internal tube of a pressure regulator in accordance with the present invention.

With reference to FIG. 4 and FIG. 7, the external tube 11 has an end disposed inside the first internal tube 13. The first internal tube 13 has a chamber 131 thoroughly communicating with the high-pressure exhaustion channel 120 axially. In an embodiment, the first internal tube 13 is mounted outside the intermediate section 150 of the external tube 11.

With reference from FIG. 4 and FIG. 7 to FIG. 9, the second internal tube 14 aforementioned is mounted in the first internal tube 13. The high-pressure piston chamber 141 is formed within the second internal tube 14 and is formed axially through the second internal tube 14. The second internal tube 14 has an external wall having an elongated groove 142 which is formed on the external wall. The elongated groove 142 has a high-pressure exhaustion hole 143 formed transversely through the second internal tube 14. Therefore, the high-pressure exhaustion hole 143 communicates with the high-pressure piston chamber 141, the high-pressure piston chamber 141 communicates with the chamber 131 of the first internal tube 13 throughout the high-pressure exhaustion hole 143, and the high-pressure piston chamber 141 further communicates with the high-pressure exhaustion channel 120 of the external tube 11 throughout the chamber 131 of the first internal tube 13.

Figure 2:
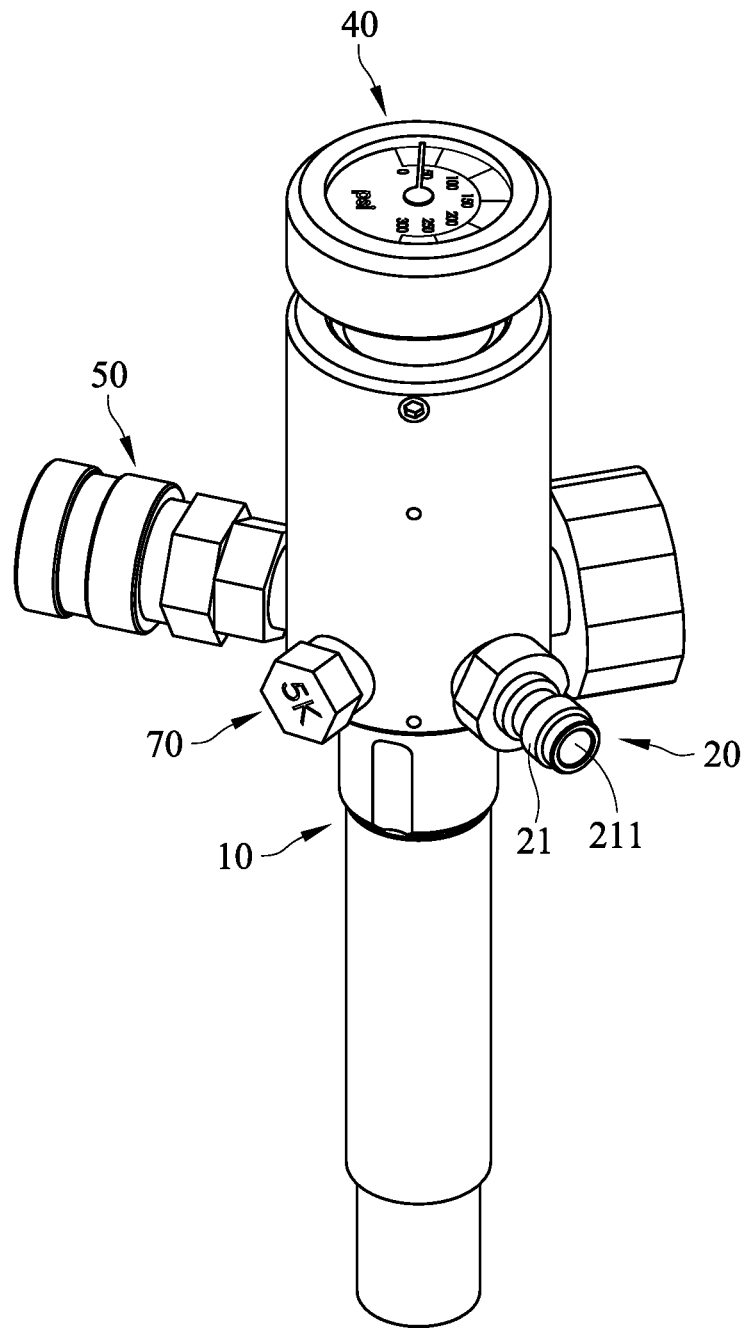
FIG. 2 is another perspective view of a pressure regulator in accordance with the present invention.
Figure 3:
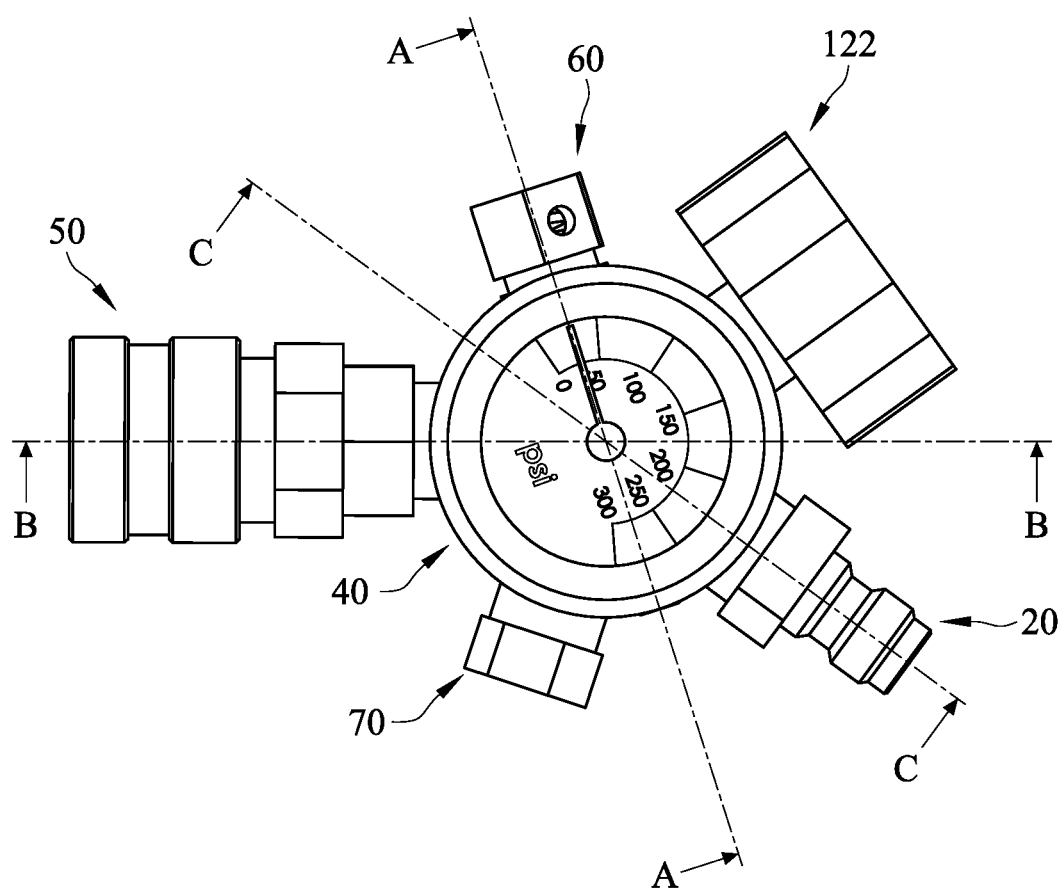
FIG. 3 is a top view of a pressure regulator in accordance with the present invention.
Figure 6C:
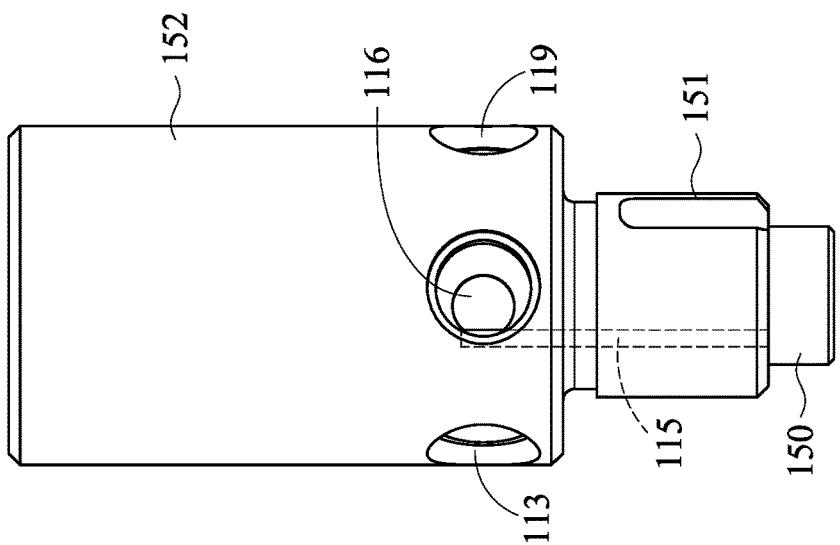
Figure 6B:
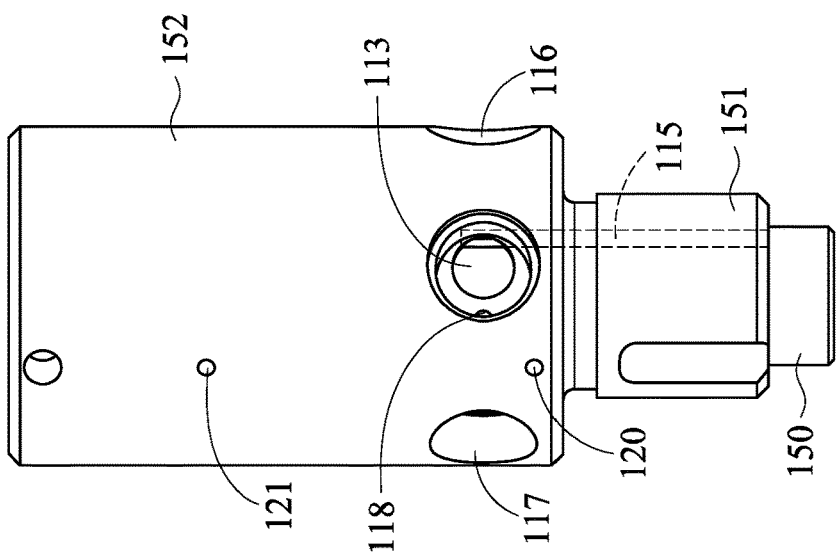
Figure 10:
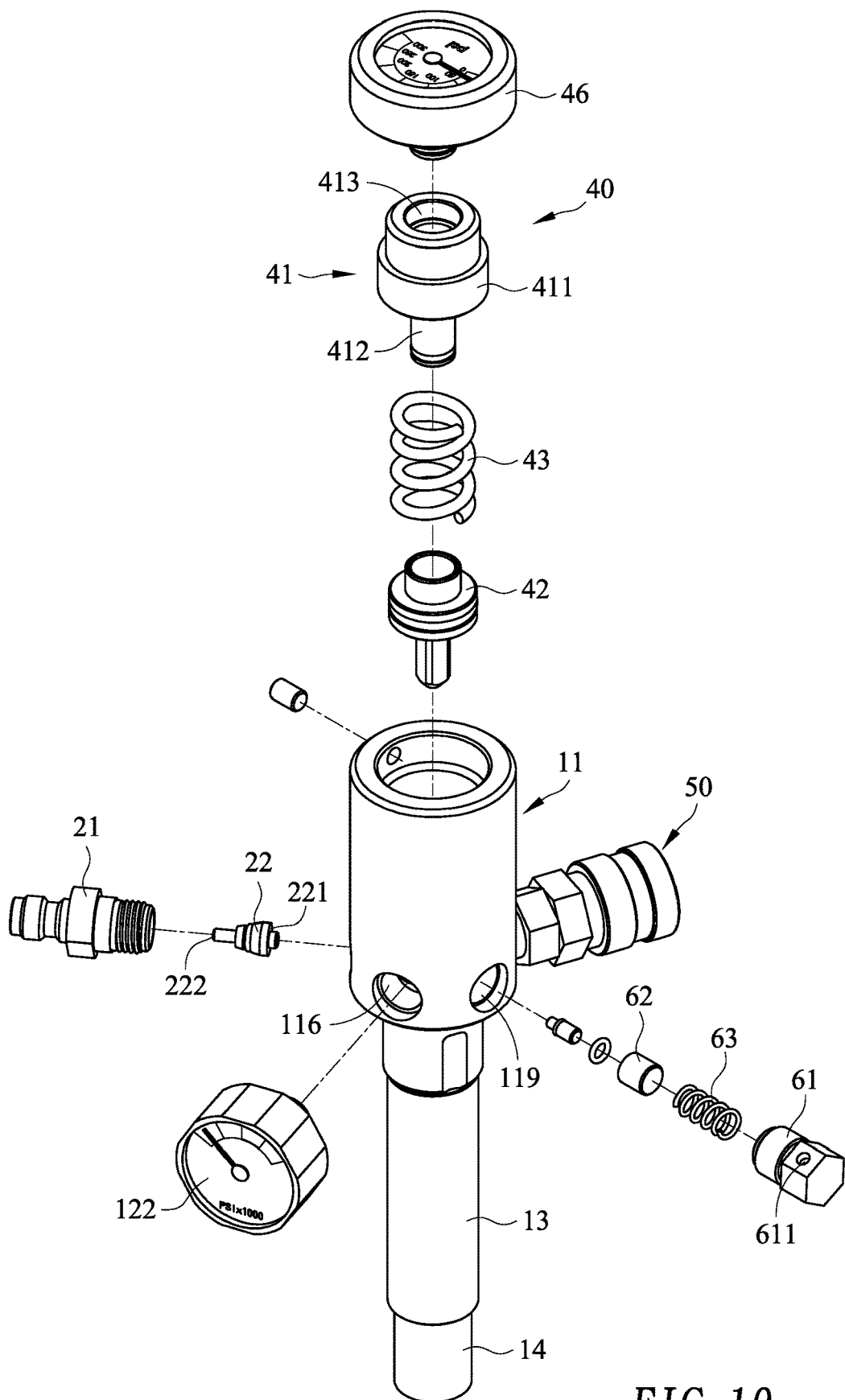
FIG. 10 is an exploded view of another illustrated part of a pressure regulator in accordance with the present invention.

With reference to FIG. 2, FIG. 6B and FIG. 10, the gas-input assembly 20 is disposed in the gas inlet orifice 113 of the external tube 11. The gas inlet orifice 113 is closed by the gas-input assembly 20 normally. When the gas-input assembly 20 is connected to a high-pressure source, the high-pressure source injects a high-pressure gas into the gas-input channel 115 throughout the gas-input assembly 20. In an embodiment, the gas-input assembly 20 has a gas-input tube 21 and a gas-input plug 22. The gas-input tube 21 is mounted within the gas inlet orifice 113 and has a central hole 211, the gas-input plug 22 has a wider end 221 and a narrower end 222. The narrower end 222 of the gas-input plug 22 is disposed corresponding to the central hole 211 of the gas-input tube 21.

Figure 11:
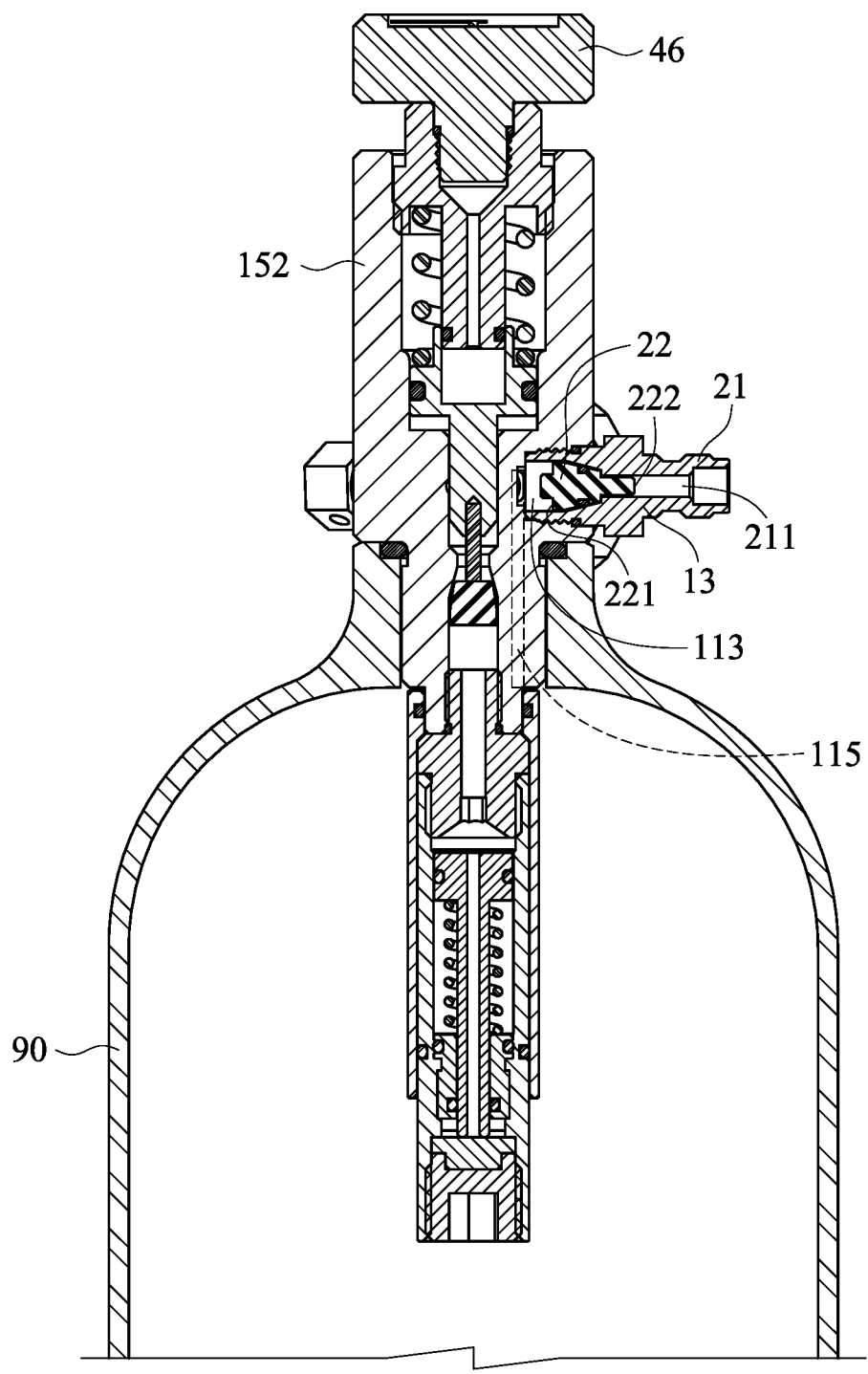
FIG. 11 is a cross sectional view from a third lateral side of a gas storage device showing an internal action of the gas storage device in accordance with the present invention.
Figure 12:
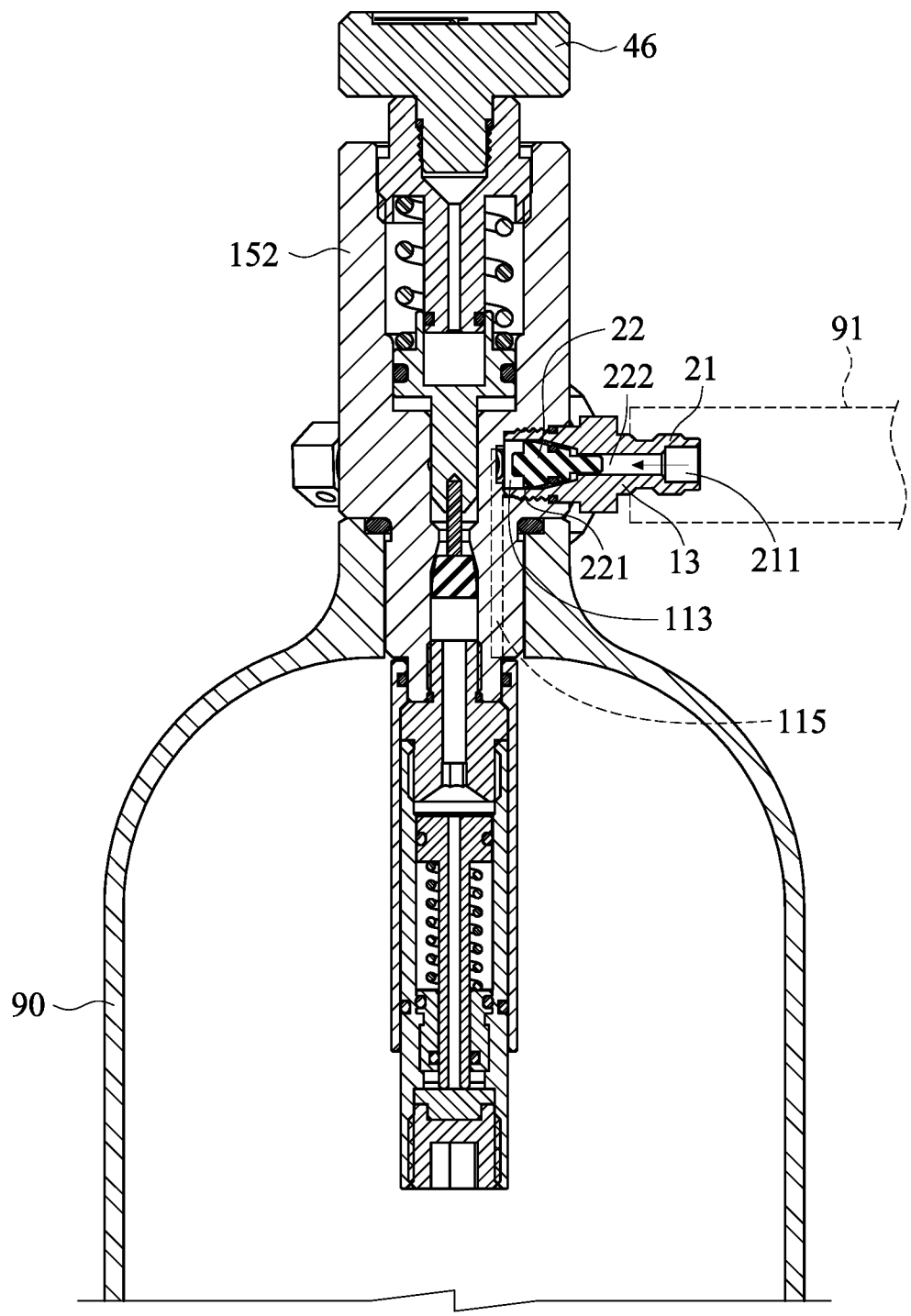
FIG. 12 is a cross sectional view from a fourth lateral side of a gas storage device showing an internal action of the gas storage device in accordance with the present invention.

When the gas-input assembly 20 is not connected to the high-pressure source (as shown in FIG. 11), a gas in the gas storage unit 90 has a gas pressure capable of pushing the gas-input plug 22 into the gas-input channel 115. As a result, the narrower end 222 of the gas-input plug 22 is plugged in the central hole 211 of the gas-input tube 21, the wider end 221 of the gas-input plug 22 closes the central hole 211 of the gas-input tube 21. Then the gas in the gas storage unit 90 does not be leak via the gas-input assembly 20. When the gas-input assembly 20 is connected with the high-pressure source 91 (as shown in FIG. 12), a high-pressure gas from the high-pressure source 91 pushes against the gas-input plug 22 to form a high-pressure gas channel Consequently, the high-pressure gas from the high-pressure source 91 is injected and stored in the gas storage unit 90 by flowing through the central hole 211 of the gas-input tube 21 into the gas-input channel 115.

Figure 9:
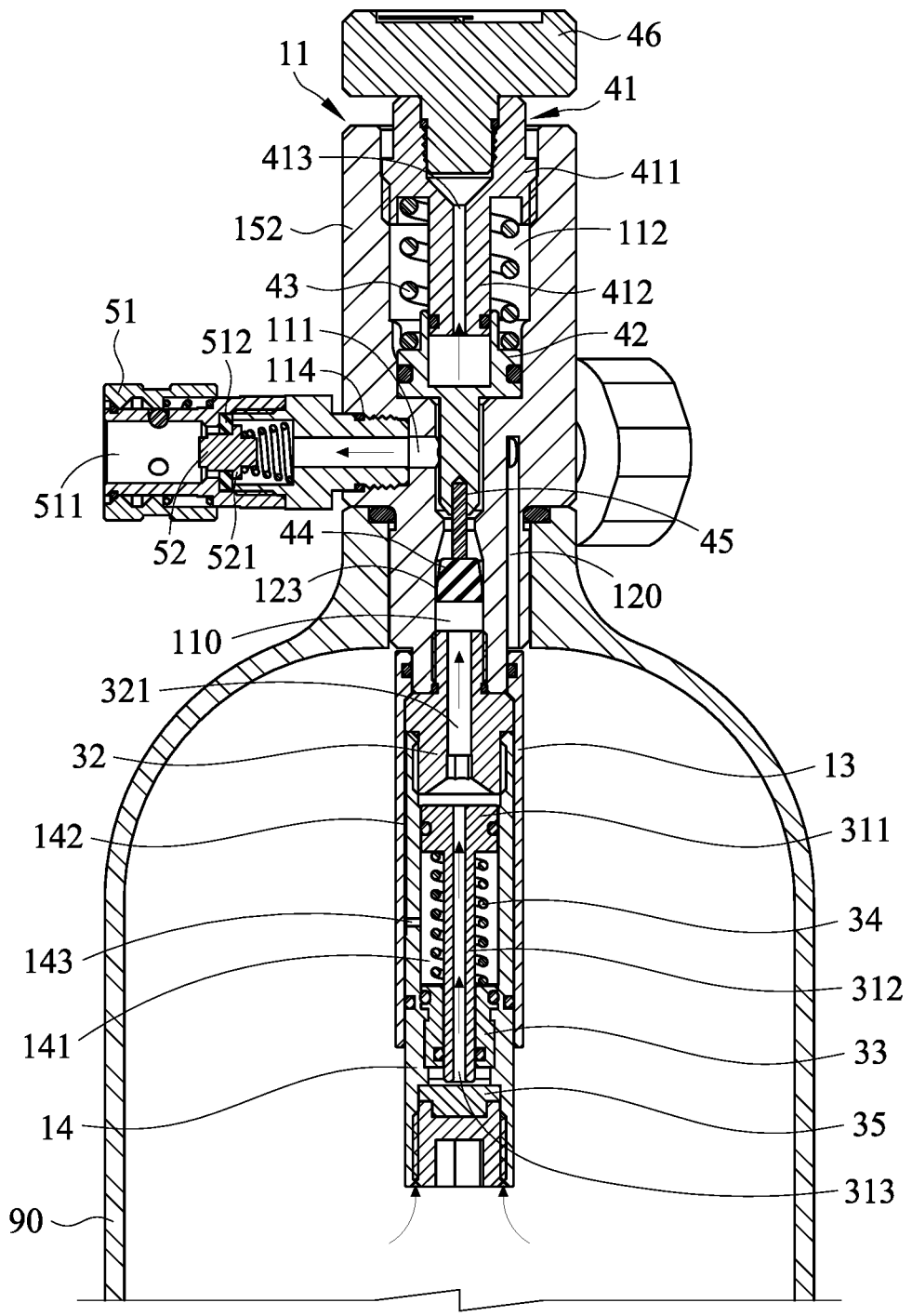
FIG. 9 is a cross sectional view from a second lateral side of a gas storage device showing an internal action of the gas storage device in accordance with the present invention.

With reference to FIG. 4 and FIG. 9, the first regulating assembly 30 is disposed in the first internal tube 13 and the second internal tube 14. The first regulating assembly 30 has a high-pressure piston 31, a high-pressure connection part 32, a high-pressure adjustment part 33, a high-pressure elastic element 34 and a airproof part 35. The high-pressure piston 31 is disposed in the high-pressure piston chamber 141 of the second internal tube 14. The high-pressure piston 31 has an enlarged head 311 and a piston rod 312 where the high-pressure piston 31 has a first high-pressure channel 313 formed by being formed axially through the high-pressure piston 31. The high-pressure connection part 32 has a first end, a second end and a second high-pressure channel 321. The first end of the high-pressure connection part 32 is mounted in the intermediate chamber 110 of the external tube 11. The second end of the high-pressure connection part 32 is mounted within the first internal tube 13 and the second internal tube 14. The second high-pressure channel 321 is formed axially through the high-pressure connection part 32. The high-pressure adjustment part 33 is mounted within the high-pressure piston chamber 141 of the second internal tube 14 and is mounted outside the piston rod 312. The high-pressure elastic element 34 is mounted outside the piston rod 312 of the high-pressure piston 31. The high-pressure elastic element 34 is clamped between the enlarged head 311 of the high-pressure piston 31 and the high-pressure adjustment part 33. The airproof part 35 is disposed in an end of the second internal tube 14. A top surface of the airproof part 35 is attached to an end of the piston rod 312 so as to selectively close the first high-pressure channel 313 of the high-pressure piston 31.

Figure 13:
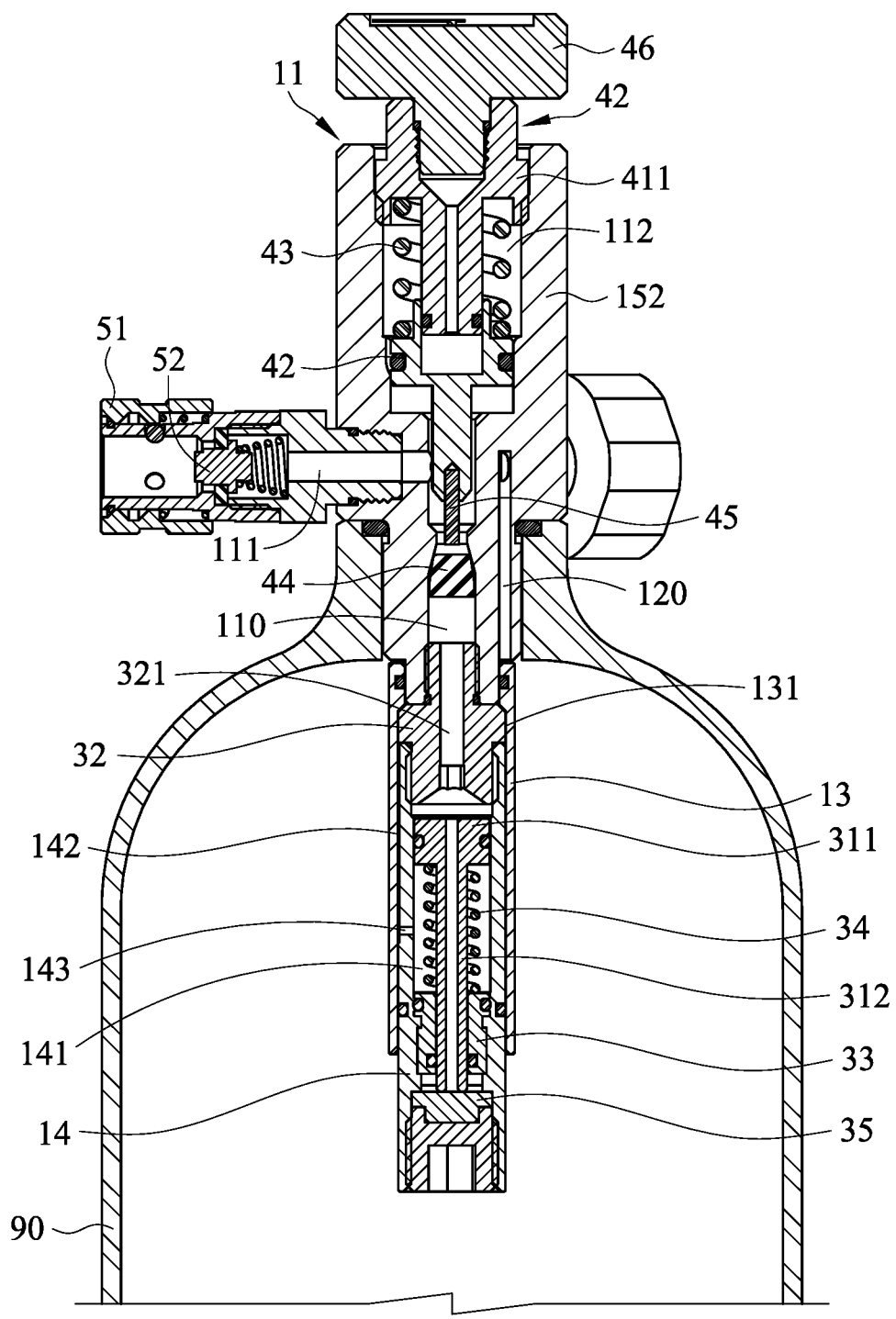
FIG. 13 is a cross sectional view from a fifth lateral side of a gas storage device showing an internal action of the gas storage device in accordance with the present invention.

With reference to FIG. 9, under normal circumstance, the high-pressure elastic element 34 pushes and upholds the high-pressure piston 31 upwardly based on the elasticity of the high-pressure elastic element 34. Therefore, the end of the piston rod 312 of the high-pressure piston 31 is separated from the top surface of the airproof part 35. Then the high-pressure gas from the gas storage unit 90 can flow through the first high-pressure channel 313 of the high-pressure piston 21 and the second high-pressure channel 321 of the high-pressure connection part 32 into the intermediate chamber 110 of the external tube 11. With reference to FIG. 13, when the high-pressure gas flowing into the intermediate chamber 110 has reached to a predetermined value of a gas pressure, the gas pressure in the intermediate chamber 110 is accumulated enough to resist the elasticity of the high-pressure elastic element 34. As a result, the high-pressure piston 31 is pushed downwardly until the end of the piston rod 312 is attached to the top surface of the airproof part 35. In consequence, the continuous flow of the high-pressure gas entering into the high-pressure channel 313 of the high-pressure piston 31 is intercepted. Particularly, when the high-pressure piston 31 within the high-pressure piston chamber 141 initiates a compression stroke to exhaust or supply the high-pressure gas into the high-pressure piston chamber 141, the high-pressure piston chamber 141 communicates with the outside of the gas storage unit 90 throughout the high-pressure exhaustion hole 143 of the second internal tube 14, the elongated groove 142 and the high-pressure exhaustion channel 120 of the external tube 11.

Figure 14:
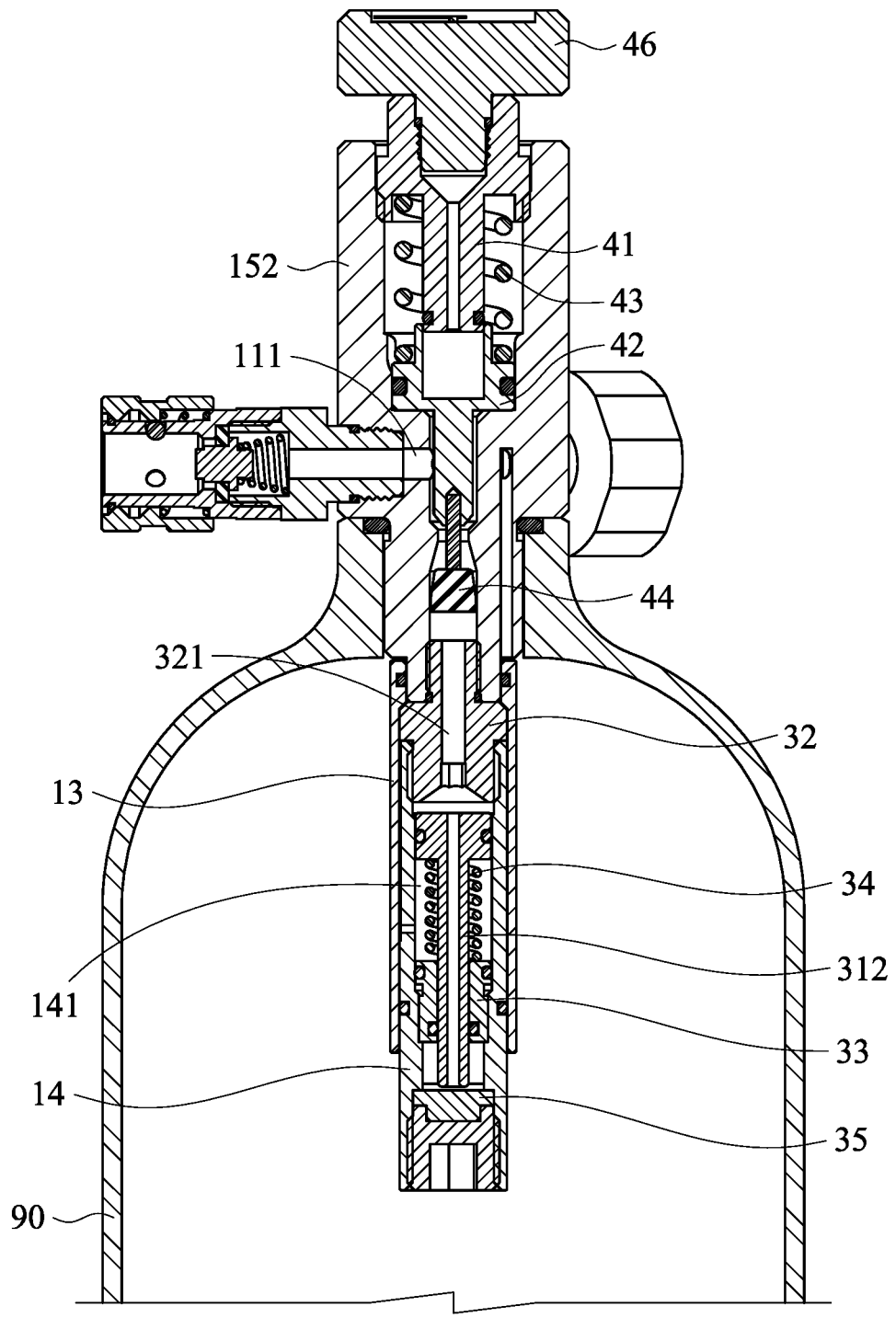
FIG. 14 is a cross sectional view from a sixth lateral side of a gas storage device showing an internal action of the gas storage device in accordance with the present invention.
Figure 15:
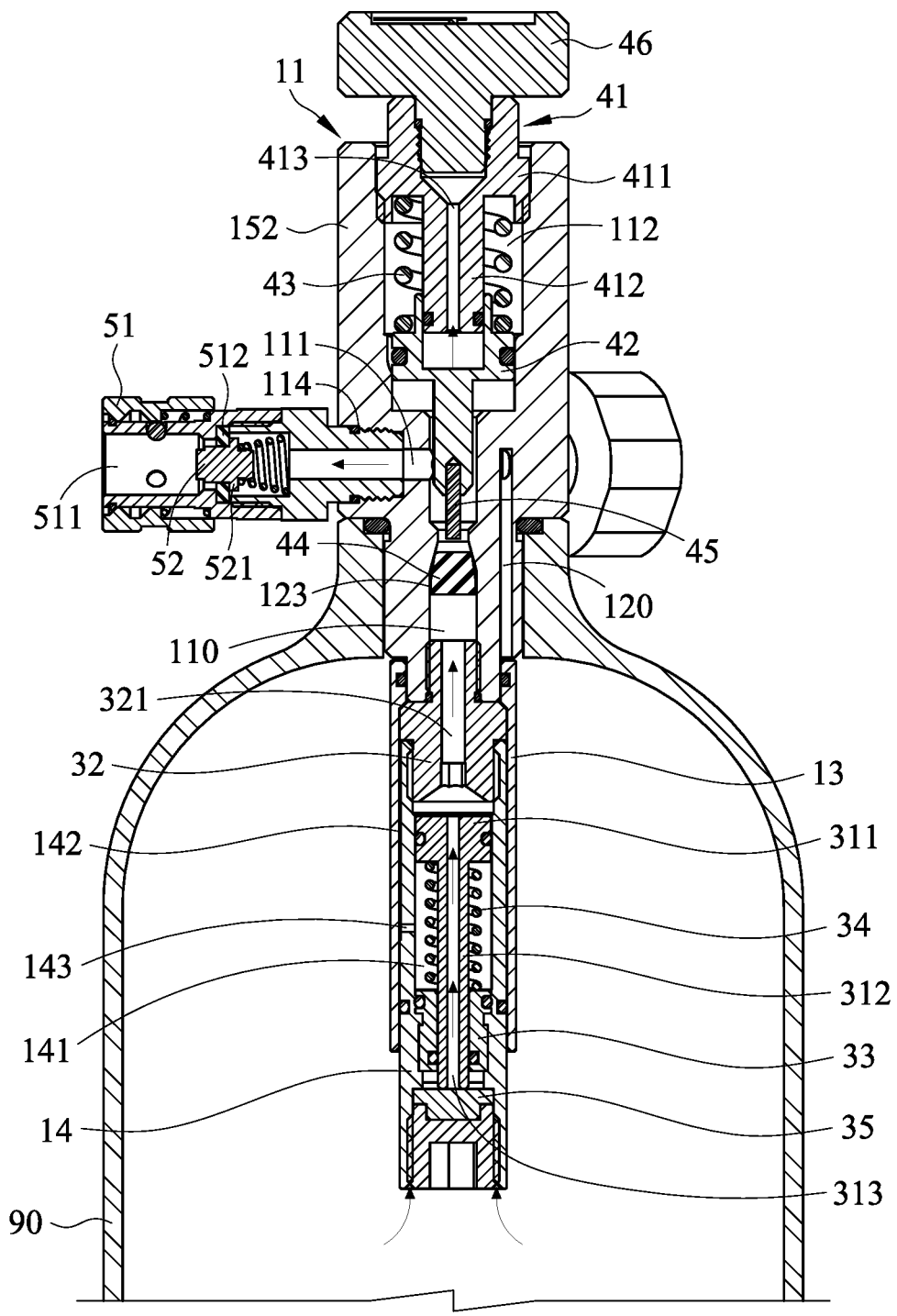
FIG. 15 is a cross sectional view from a seventh lateral side of a gas storage device showing an internal action of the gas storage device in accordance with the present invention.

The predetermined value of the gas pressure in the intermediate chamber 110 may be set by adjusting a position of the high-pressure adjustment part 33. When the high-pressure adjustment part 33 is disposed at a farther position relative to the intermediate chamber 110 (as shown in FIG. 9), the predetermined compression scale required for the high-pressure elastic element 34 becomes smaller. Therefore, once the gas pressure accumulated in the intermediate chamber 110 has achieved a smaller scale of the gas pressure, the high-pressure piston 31 is pushed backwardly and attached to the top surface of the airproof part 35. On the other hand, when the high-pressure adjustment part 33 is disposed at a closer position relative to the intermediate chamber 110 (as shown in FIG. 14), the predetermined compression scale required for the high-pressure elastic element 34 becomes larger. Therefore, the high-pressure piston 31 is not pushed back and attached to the top surface of the airproof part 35 until the gas pressure accumulated in the intermediate chamber 110 has achieved a larger scale of the gas pressure.

Figure 16:
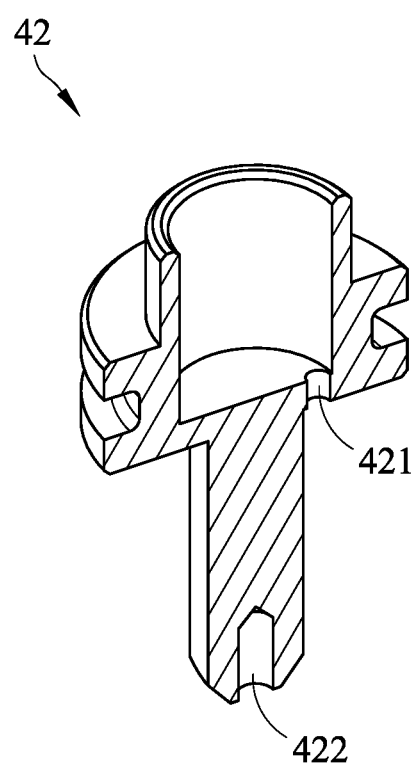
FIG. 16 is a cross sectional perspective view of a low pressure connecting device of a pressure regulator in accordance with the present invention.

With reference to FIG. 9, FIG. 10 and FIG. 16, the second regulating assembly 40 is disposed in the low-pressure section 151 of the external tube 11. The second regulating assembly 40 has a low-pressure piston 41, a low-pressure connection part 42, a low-pressure elastic element 43, a stopper 44 and a bolt 45. The low-pressure piston 41 is disposed in the low-pressure piston chamber 112 of the external tube 11. The low-pressure piston 41 has an enlarged head 411 and a piston rod 412. The low-pressure connection part 42 is mounted in the low-pressure chamber 111 and the low-pressure piston chamber 112. The low-pressure elastic element 43 is mounted outside the piston rod 412 of the low-pressure piston 41. The low-pressure elastic element 43 is clamped between the enlarged head 411 of the low-pressure piston 41 and the low-pressure connection part 42. The stopper 44 is disposed in the intermediate chamber 110 of the external tube 11. The low-pressure connection part 42 and the stopper 44 are fixed with each other. In consequence, the stopper 44 selectively closes the communication between the intermediate chamber 110 and the low-pressure chamber 111. In an embodiment, the intermediate chamber 110 has a conical section 123, which has an interior diameter grown narrower. The conical section 123 has a first end and a second end. The first end disposed adjacent to the high-pressure piston chamber 141 has a wider interior diameter. The second end disposed adjacent to the low-pressure chamber 111 has a narrower interior diameter. The stopper 44 is conical and having a first end with a wider exterior diameter and a second end with a narrower exterior diameter where the first end of the stopper 44 is disposed towards the high-pressure piston chamber 141 and the second end of the stopper 44 is disposed towards the low-pressure chamber 111. The bolt 45 is mounted securely in an end hole 421 of the low-pressure connection part 42 selectively attached to a surface of the stopper 44. Generally, with reference to FIG. 16, under the circumstance that the intermediate chamber 110 has filled with a gas before the low-pressure piston 41 is screwed into the external tube 11, the gas in the intermediate chamber 110 pushes the stopper 44. Meanwhile, the first end with the wider exterior diameter of the stopper 44 would be plugged into the second end with the narrower interior diameter of the conical section 123 of the low-pressure chamber 111 so as to close the communication between the intermediate chamber 110 and the low-pressure chamber 111.

Figure 5:
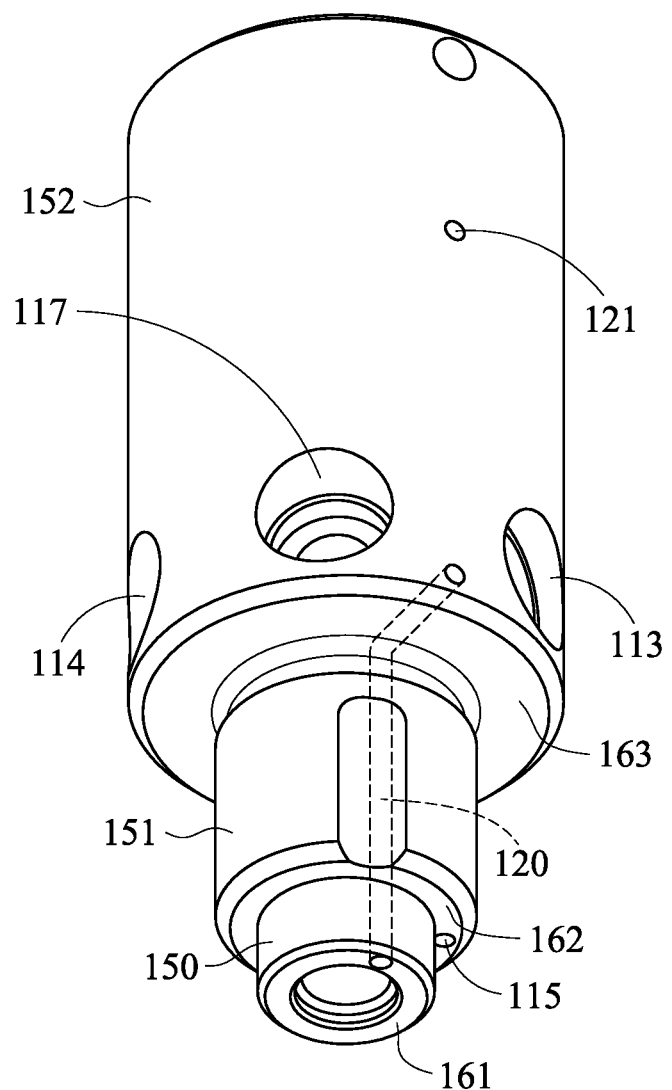
FIG. 5 is a perspective view of an external tube of a pressure regulator in accordance with the present invention.

With reference to FIG. 9, when the low-pressure piston 41 is screwed into the external tube 11, the low-pressure piston 41 compresses the low-pressure elastic element 43. The low-pressure elastic element 43 pushes the low-pressure connection part 42 and the bolt 45 downwardly based on the elasticity of the low-pressure elastic element 43. As a result, the stopper 44 is moved by the push from the bolt 45, such that the second end with the narrower exterior diameter of the stopper 44 is plugged into the first end with the wider interior diameter of the conical section 123 of the low-pressure chamber 111. Therefore, the high-pressure gas in the intermediate chamber 110 flows into the low-pressure chamber 111 throughout a slit formed between the stopper 44 and an internal wall of the intermediate chamber 110. Particularly, when the low-pressure piston 41 within the low-pressure piston chamber 112 initiates a compression stroke to exhaust or supply the gas into the low-pressure piston chamber 112, the low-pressure piston chamber 112 communicates with an outside of the external tube 11 throughout the low-pressure exhaustion channel 121 (as shown in FIG. 5).

The predetermined value of the gas pressure in the low-pressure chamber 111 may be set by adjusting a position of the low-pressure piston 41. When the enlarged head 411 of the low-pressure piston 41 is disposed at a farther position relative to the low-pressure chamber 111 (as shown in FIG. 9), the predetermined compression scale required for the low-pressure elastic element 43 becomes smaller. Therefore, once the gas pressure accumulated in the low-pressure chamber 111 has achieved a smaller scale of the gas pressure, the low-pressure piston 41 is pushed upwardly where the stopper 44 would close the communication between the intermediate chamber 110 and a low-pressure chamber 111. On the other hand, when the enlarged head 411 of the low-pressure piston 41 is disposed at a closer position relative to the low-pressure chamber 111 (as shown in FIG. 14), the predetermined compression scale required for the low-pressure elastic element 43 becomes larger. Therefore, the low-pressure piston 31 is not pushed upwardly, and the communication between the intermediate chamber 110 and the low-pressure chamber 111 is not closed until the gas pressure accumulated in the low-pressure chamber 111 achieves a larger scale of the gas pressure.

Figure 17:
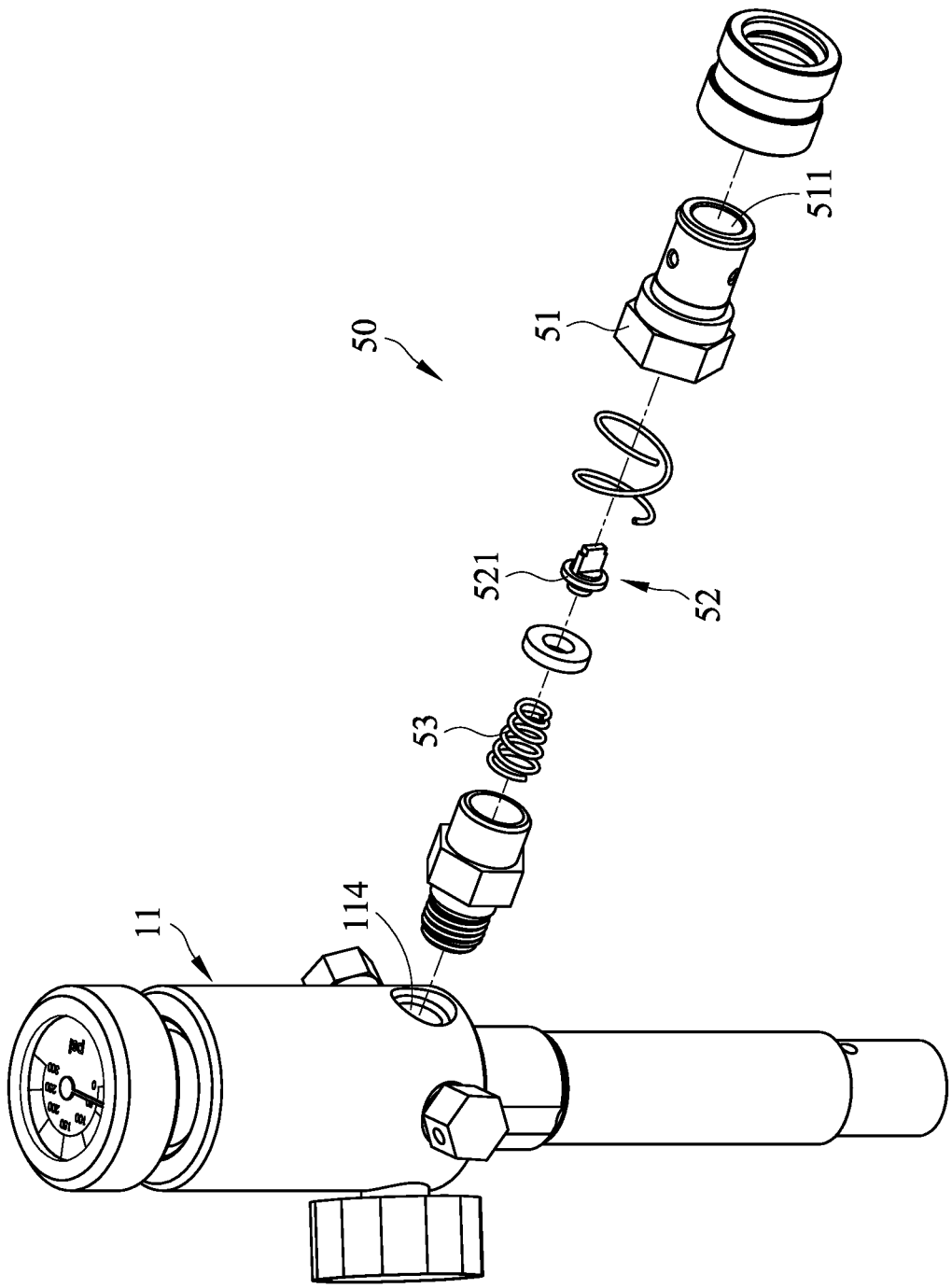
FIG. 17 is an exploded view of the other illustrated part of a pressure regulator in accordance with the present invention.

With reference to FIG. 9 and FIG. 17, the gas-output assembly 50 aforementioned is disposed in the gas outlet orifice 114 of the external tube 11. The gas-output assembly 50 keeps the gas outlet orifice 114 to be closed normally. When an objective device required the use of the compressed gas (such as the air gun or the pneumatic tool) is connected to the gas-output assembly 50, the objective device opens the gas-output assembly 50 to make a gas in the low-pressure chamber 111 to flow into the objective device throughout the gas outlet orifice 114. In an embodiment, the gas-output assembly 50 has a gas-output tube 51 and a gas-output plug 52. The gas-output tube 51 is mounted within the gas outlet orifice 114 and has a central hole 511. The central hole 511 has an internal bump 512 formed transversely within the central hole 511. In an embodiment, the gas-output tube 51 has two pieces and the gas-output plug 52 has a shoulder 521 extending transversely.

Figure 18:
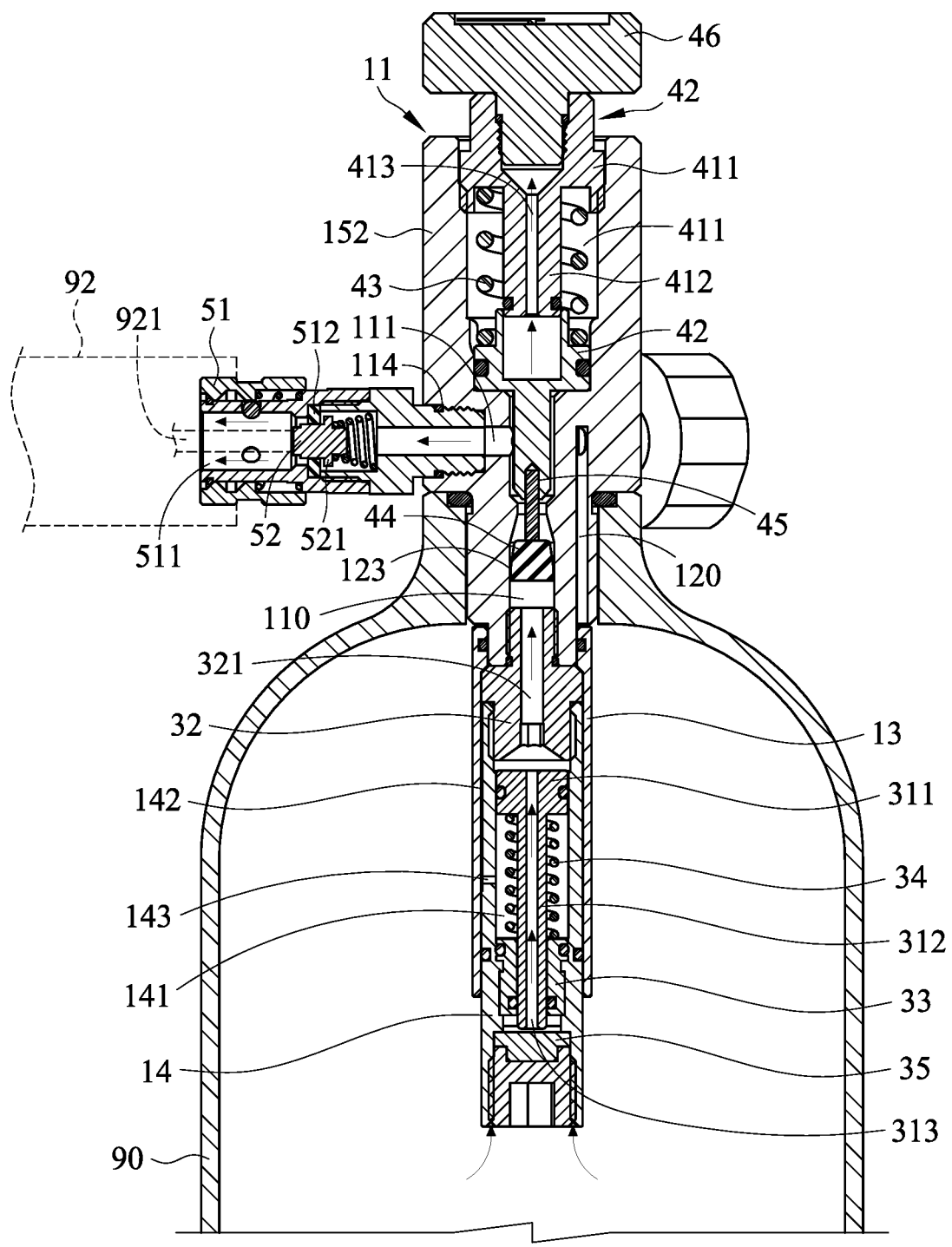
FIG. 18 is a cross sectional view from a seventh lateral side of a gas storage device showing an internal action of the gas storage device in accordance with the present invention.

When the objective device is not connected to the gas-output assembly 50 (as shown in FIG. 9), the gas in the low-pressure chamber 111 has a gas pressure pushing against the gas-output plug 52, so that the shoulder 521 of the gas-output plug 52 attaches to the internal bump 512 of the gas-output tube 51. In consequence, the shoulder 521 of the gas-output plug 52 and the internal bump 512 of the gas-output tube 51 close the central hole 511 of the gas-output tube 51, and the gas in the gas storage unit 90 is not leaked via the gas-output assembly 50. In an embodiment, a return spring 53 is disposed in the gas-output tube 51 and pushes against the shoulder 521 of the gas-output plug 52 to move towards the internal bump 512 of the gas-output tube 51. Therefore, the shoulder 521 of the gas-output plug 52 is surely attached to the internal bump 512 of the gas-output tube 51 so as to efficiently close the central hole 511 of the gas-output tube 51. When the objective device 92 is connected to the gas-output assembly 50 (as shown in FIG. 18), the connecting port 921 of the objective device 92 pushes the gas-output plug 52 away. As a result, the shoulder 521 of the gas-output plug 52 is away from the internal bump 512 of the gas-output tube 51 to form a channel for the gas in the low-pressure chamber 111 flowing through the gas outlet orifice 114 and the central hole 511 of the gas-output tube 51, then entering into the objective device 92 for further application.

With reference to FIG. 1, FIG. 6C and FIG. 10, in an embodiment, a high-pressure gauge is disposed in the test orifice 116. Because the test orifice 116 communicates with the gas inlet orifice 113 throughout a gas-input channel 115, the high-pressure gauge detects the gas pressure in the gas storage unit 90 throughput the test orifice 116 and the gas-input channel 115. As a result, the users recognize the gas pressure in the gas storage unit 90 throughout the high-pressure gauge 122.

With reference to FIG. 3, FIG. 9, FIG. 10, to FIG. 16, in an embodiment, the low-pressure connection part 42 has a through hole 421 formed longitudinally through the low-pressure connection part 42. The low-pressure piston 41 has a low-pressure channel 413 formed axially through the low-pressure piston 41. The low-pressure channel 413 and the low-pressure chamber 111 communicate with each other through the through hole 421. The low-pressure channel 413 has a first opening communicating with the through hole 421 of the low-pressure connection part 42. A second opening of the low-pressure channel 413 communicates with the low-pressure gauge 46. Because the low-pressure channel 413 communicates with the low-pressure chamber 111 via the through hole 421, the low-pressure gauge 46 detects the gas pressure in the low-pressure chamber 111 through the low-pressure channel 413. As a result, the users recognize the current gas pressure in the low-pressure chamber 11, i.e. the gas pressure input to the objective device 92 as well. In addition, the low-pressure gauge 46 is disposed axially and disposed at a top end of the pressure regulator, the users is convenient to directly observe the output value of the gas pressure of the gas in use.

With reference to FIG. 7 and FIG. 13, when the objective device finishes the use of the pressure regulator, considering the overall safety, the low-pressure piston 41 is screwed out of the external tube 11 to exhaust the high-pressure gas in the intermediate chamber 110 and the low-pressure chamber 111. During a process of screwing out the low-pressure piston 41, the force pushing against the low-pressure elastic element 43 is educed when the low-pressure piston 41 moves outwardly. Therefore, the low-pressure connection part 42 is pushed by the gas stored in the low-pressure chamber 111 and moved upward slightly. In consequence, the wall surface of the low-pressure connection part 42 is moved to the groove 125 of the external tube 11. The groove 125 makes that the wall surface of the low-pressure connection part 42 is not attached to the internal surface of the external tube 11. Thus, the gas in the low-pressure chamber 111 flows into the low-pressure piston chamber 112 throughout the groove 125. Meanwhile, the gas flowing into the low-pressure piston chamber 112 is exhausted through the low-pressure exhaustion channel 121 until the gas in the low-pressure chamber is entirely exhausted. Likewise, the gas pressure in the low-pressure chamber 111 is adjusted by screwing the low-pressure piston 41. For example, when the original gas pressure in the low-pressure chamber 111 is 200 psi, but the current demanded gas pressure is 150 psi. The low-pressure gauge 46 is screwed as well as the low-pressure piston 41 to make the wall surface of the low-pressure connection part 42 move to the groove 125 of the external tube 11. Then a few of the gas in the low-pressure chamber 111 is exhausted so as to adjust the gas pressure in the low-pressure chamber 111 to the scale of 150 psi.

With reference to FIG. 1, FIG. 7 and FIG. 10, in an embodiment, a gas releasing assembly 60 is disposed in the gas releasing orifice 119 of the external tube 11. When the gas pressure in the low-pressure chamber 111 is over a predetermined value of safety (for example 200 psi), the gas releasing assembly 60 is used to exhaust a few of the gas in the low-pressure chamber 111 to keep the gas pressure in the low-pressure chamber 111 sustained within the scope of safety. In an embodiment, the gas releasing assembly 60 has a gas releasing tube 61, a gas releasing piston 62 and a gas releasing elastic element 63. The gas releasing tube 61 is mounted in the gas releasing orifice 119 and has a drilled hole 611 formed transversely therethrough. The gas releasing piston 62 is mounted in the gas releasing tube 61, the gas releasing piston 62 selectively closes the communication between the drilled hole 611 of the gas releasing tube 61 and the low-pressure chamber 111. The gas releasing elastic element 63 is clamped between the gas releasing piston 62 and an internal surface of the gas releasing tube 61. The gas releasing piston 62 is pushed towards the low-pressure chamber 111 by the gas releasing elastic element 63 so that the gas releasing piston 62 is attached to a bump formed at the internal surface of the gas releasing tube 61 between the low-pressure chamber 111 and the gas releasing orifice 119. The predetermined value of safety may be decided by the alternatives of the gas releasing elastic element 63. In the normal status, the gas releasing elastic element 63 pushes against the gas releasing piston 62 to move towards the low-pressure chamber 111, from which the gas releasing piston 62 closes the communication between the through hole of the gas releasing tube 61 and the low-pressure chamber 111. When the gas pressure in the low-pressure chamber 111 is over the predetermined value of safety, the gas pressure in the low-pressure chamber 111 is large enough to resist an elastic force from the gas releasing elastic element 63. In consequence, the gas releasing piston 62 is moved across the drilled hole 611 of the gas releasing tube 61 where a slight portion of the gas in the low-pressure chamber 111 is able to leak out through the drilled hole 611. Therefore, the slight adjustment for the gas pressure in the low-pressure chamber 111 would be achieved.

Figure 6A:
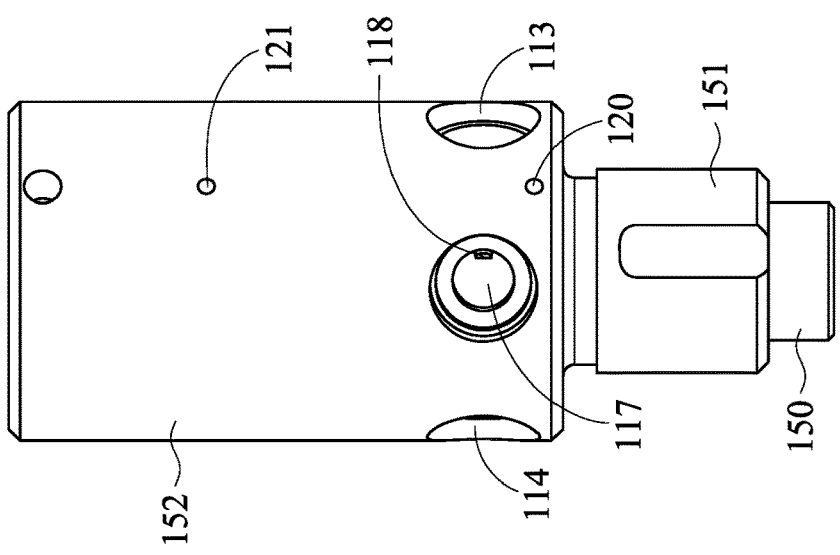

With reference to FIG. 2, FIG. 6A and FIG. 18, in an embodiment, an anti-explosion assembly 70 is disposed in the anti-explosion orifice 117 of the external tube 11. The anti-explosion assembly 70 is provided for keeping the maximum value of the internal gas pressure below a certain scope of safety. Therefore, the risk of damage or even the danger of explosion occurred to the gas storage unit 90 or any other assemblies caused by the over high internal pressure is avoided. Because the anti-explosion channel 118 communicates with the gas inlet orifice 113 throughout the anti-explosion orifice 117, the gas inlet orifice 113 communicates with the gas storage unit 90 throughout the gas-input channel 115. Consequently, once the gas pressure in the gas storage unit 90 has reached to the predetermined value of safety, such as 5000 psi, the anti-explosion assembly 70 would be damaged instantly. Meanwhile, the damage of the anti-explosion assembly 70 makes the anti-explosion orifice 117 communicate with the outside of the gas storage unit 90 right away. Therefore, the gas in the gas storage unit 90 would be completely exhausted throughout the anti-explosion orifice 117, from which the maximum value of the internal gas pressure could be effectively kept below the predetermined value of safety so the use of safety is assured.

Furthermore, the pressure regulator 1 in accordance with the present invention has the airproof rings in the appropriate positions to prevent the occurrence of the gas interference. The following examples are for the illustrations only and constitutes no further restriction. A first airproof ring is mounted around the high-pressure adjustment part 33 to prevent the gas in the gas storage unit 90 from flowing into the high-pressure piston chamber 141. A second airproof ring is mounted around the enlarged head 311 of the high-pressure piston 31 to prevent the gas in the intermediate chamber 110 from flowing into the high-pressure piston chamber 141. A third airproof ring is mounted around a connecting portion between the external tube 11 and the gas storage unit 90 to prevent the high-pressure gas from leaking out through the connecting portion. A fourth airproof ring is mounted around the low-pressure connection part 42 to prevent the gas in the low-pressure chamber 111 from flowing into the low-pressure piston chamber 112.

Furthermore, the high-pressure elastic element 34 and the low-pressure elastic element 43 include any kind of appropriate elastic elements but not limited to the elastic elements such as the spring, the flat spring, the resilient washer and clip etc.

Figure 19:
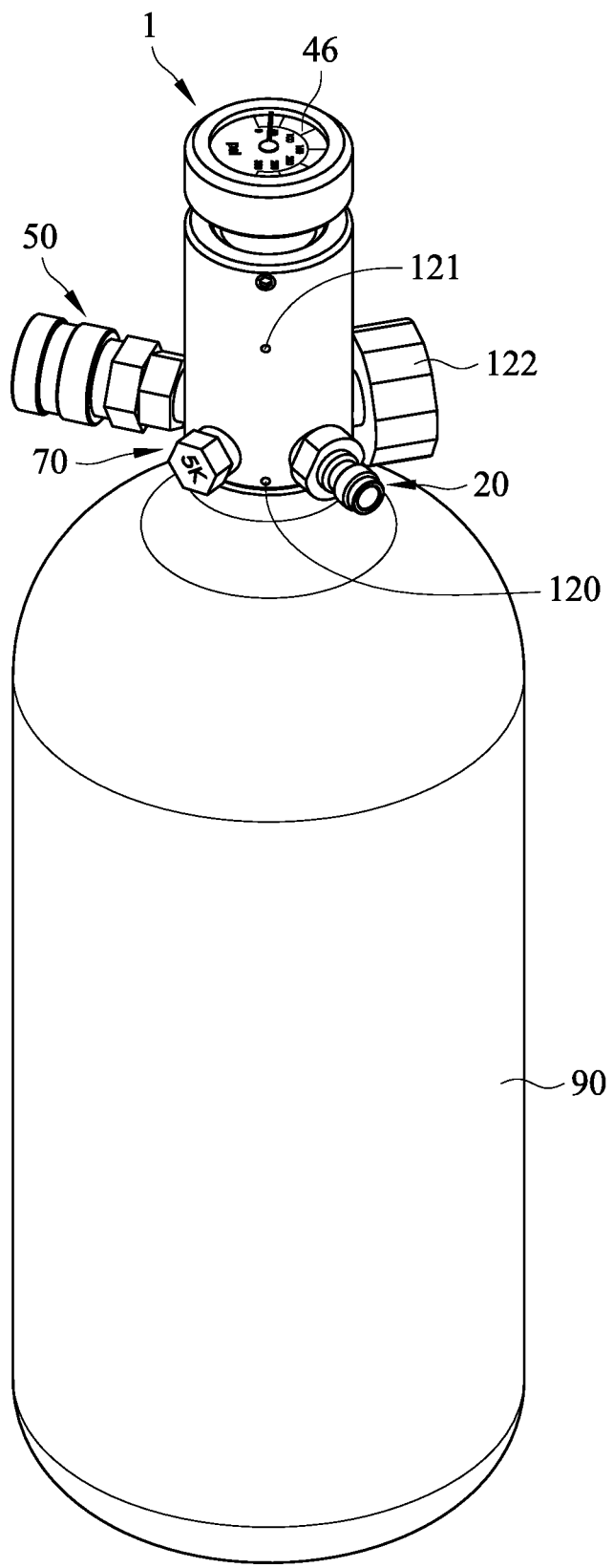
FIG. 19 is a perspective view of a gas storage device in accordance with the present invention.

Generally with reference to FIG. 1 and FIG. 19, the pressure regulator 1 is assembled with the gas storage unit 90 to form a gas storage device in normal application. A portion of the external tube 11, the first internal tube 13 and the second internal tube 14 are inserted in the gas storage unit 90. The other portion of the external tube 11 is disposed outside the gas storage unit 90. Particularly, the high-pressure exhaustion channel 120 of the external tube 11 has a first opening exposed to an outside of the gas storage unit 90. When injecting the high-pressure gas (as shown in FIG. 12), the gas-input assembly 20 is connected to the high-pressure source 91, and the high-pressure gas 91 from the high-pressure source 91 is injected by the gas-input assembly 20 and stored in the gas storage unit 90. In addition, the high-pressure gas in the gas storage unit 90 is reduced to a required scale of the output gas pressure in the low-pressure chamber 111 after the regulation operated by the first regulating assembly 30 and the second regulating assembly 40 (as shown in FIG. 9). For example, the high-pressure gas in the gas storage unit 90 is 2000 psi, the first regulating assembly 30 reduces the value of the gas pressure down to 500 psi at first, and then the second regulating assembly 40 further reduces the value of the gas pressure down to 150 psi for the use in demand. Besides, the two-step pressure regulation decreases the possibility of malfunction or device damage caused by the single-step pressure regulation. When it applied to the objective device 92 (as shown in FIG. 18), the gas-output assembly 50 is connected to the objective device 92, and the gas in the low-pressure chamber 111 having a reduced scale of the required gas pressure would be able to flow through the gas-output assembly 50 into the objective device 92 for further use.

In order to reduce the whole volume of the pressure regulator 1 and the gas storage unit 90, the first internal tube 13 and the second internal tube 14 are inserted inside the gas storage unit 90 in accordance with the present invention. Considering of keeping the normal function of the high-pressure piston chamber 141 inserted inside the gas storage unit 90, when the high-pressure piston 31 initiates a compression stroke in the high-pressure piston chamber 141 axially, it would be necessary for the high-pressure piston chamber 141 to exhaust the gas after the compression and supply the gas after the expansion. However, the high-pressure piston chamber 141 cannot communicate with the gas storage unit 90 internally throughout the opening of the second internal tube 14 directly. In case that the high-pressure gas in the gas storage unit 90 enters into the high-pressure piston chamber 141, it would cause the malfunction or even the damage to the high-pressure piston chamber 141. As a result, the structural collocation of the second internal tube 14 and the external tube 11 makes the high-pressure piston chamber 141 communicate with the outside of the gas storage unit 90 throughout the high-pressure exhaustion channel 120 of the external tube 120. In consequence, the high-pressure piston chamber 141 exhausts the gas to the outside atmosphere throughout the high-pressure exhaustion channel 120 or supply the gas from the outside atmosphere, so that the normal function of the high-pressure piston 31 is maintained and the malfunction of the high-pressure elastic element 34 resulted from the vacuum status of the high-pressure piston chamber 141 due to the shortage of the air could be avoided.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pressure regulator, comprising:
   a valve tube assembly having
   a first internal tube having a chamber;
   an external tube having an end mounted inside the first internal tube;
   a second internal tube mounted in the first internal tube and having
      an elongated groove formed on an outside wall of the second internal tube; and
      a high-pressure exhaustion hole formed transversely through the second internal tube;
   a gas inlet orifice disposed transversely in the external tube;
   a gas outlet orifice disposed transversely in the external tube;
   a high-pressure piston chamber formed axially through the second internal tube and communicating with the chamber of the first internal tube through the high-pressure exhaustion hole of the second internal tube;
   an intermediate chamber disposed axially in the external tube;
   a low-pressure chamber disposed axially in the external tube, selectively communicating with the gas outlet orifice, and selectively communicating with the intermediate chamber;
   a low-pressure piston chamber; and
   a high-pressure exhaustion channel disposed in the external tube and having
      an axial part formed axially through the external tube and communicating with the high-pressure piston chamber; and
      a radial part formed transversely through the external tube and communicating with the axial part and adapted for communicating with an outside of the valve tube assembly;
   a gas-input assembly disposed in the gas inlet orifice of the valve tube assembly;
   a first regulating assembly disposed in the high-pressure piston chamber and the intermediate chamber of the valve tube assembly and adapted to reduce a gas pressure of a gas flowing through the first regulating assembly; and
   a second regulating assembly disposed in the low-pressure piston chamber and the low-pressure chamber of the valve tube assembly and adapted to reduce a gas pressure of a gas flowing from the intermediate chamber into the second regulating assembly.

2. The pressure regulator as claimed in claim 1, wherein the first regulating assembly is disposed in the first internal tube and the second internal tube and comprises:
   a high-pressure piston disposed in the high-pressure piston chamber of the second internal tube and having an enlarged head;
      a piston rod formed axially on the enlarged head; and
      a first high-pressure channel formed axially through the piston rod;
   a high-pressure connection part having
      a first end mounted in the intermediate chamber of the external tube;
      a second end mounted within the first internal tube and the second internal tube; and
      a second high-pressure channel formed axially through the high-pressure connection part;
   a high-pressure adjustment part mounted within the high-pressure piston chamber of the second internal tube and mounted around the piston rod;
   a high-pressure elastic element mounted around the piston rod of the high-pressure piston and clamped between the enlarged head of the high-pressure piston and the high-pressure adjustment part; and
   an airproof part disposed in an end of the second internal tube and having a top surface selectively attached to an end of the piston rod so as to selectively close the first high-pressure channel of the high-pressure piston.

3. The pressure regulator as claimed in claim 1, wherein the second regulating assembly is disposed in the external tube and comprises:
   a low-pressure piston disposed in the low-pressure piston chamber of the external tube, and having an enlarged head and a piston rod formed axially on the enlarged head;
   a low-pressure connection part mounted in the low-pressure chamber and the low-pressure piston chamber;
   a low-pressure elastic element mounted around the piston rod of the low-pressure piston and clamped between the enlarged head of the low-pressure piston and the low-pressure connection part; and
   a stopper disposed in the intermediate chamber of the external tube, attached securely to the low-pressure connection part and selectively closing the communication between the intermediate chamber and the low-pressure chamber.

4. The pressure regulator as claimed in claim 3, wherein the intermediate chamber has a conical section having an interior diameter grown narrower and having
      a first end disposed approaching to the high-pressure piston chamber and having an interior diameter; and
      a second end disposed approaching to the low-pressure chamber and having an interior diameter narrower than the interior diameter of the first end; and
   the stopper is conical and having
      a first end disposed towards the high-pressure piston chamber and having an exterior diameter; and
      a second end disposed towards the low-pressure chamber and having an exterior diameter narrower than the exterior diameter of the first end of the stopper.

5. The pressure regulator as claimed in claim 3 further comprising a low-pressure gauge, wherein the low-pressure connection part has a through hole formed axially through the low-pressure connection part;

the low-pressure piston has a low-pressure channel formed axially through the low-pressure piston;

the low-pressure channel and the low-pressure chamber communicate with each other through the through hole of the low-pressure connection part; and the low-pressure channel has
- a first opening communicating with the through hole of the low-pressure connection part; and
- a second opening communicating with the low-pressure gauge.

6. The pressure regulator as claimed in claim 1, wherein the gas-input assembly has
- a gas-input tube mounted within the gas inlet orifice and having a central hole; and
- a gas-input plug having
  - a wider end selectively closing the central hole of the gas-input tube; and
  - a narrower end disposed corresponding to the central hole of the gas-input tube.

7. The pressure regulator as claimed in claim 1 further comprising a gas-output assembly, wherein the gas-output assembly has
- a gas-output tube mounted within the gas outlet orifice and having a central hole and an internal bump formed transversely within the central hole; and
- a gas-output plug having a shoulder extending transversely and selectively attaching to the internal bump of the gas-output tube.

8. The pressure regulator as claimed in claim 1 further comprising a high-pressure gauge, wherein
the external tube has a test orifice disposed transversely and communicating with the gas inlet orifice throughout a gas-input channel of the external tube; and
the high-pressure gauge is disposed in the test orifice.

9. The pressure regulator as claimed in claim 1 further comprising a gas releasing assembly, wherein
the external tube has a gas releasing orifice disposed transversely and communicating with the low-pressure chamber; and
the gas releasing assembly is disposed in the gas releasing orifice of the external tube to exhaust some of the gas in the low-pressure chamber while the low-pressure chamber has a gas pressure over a predetermined value of safety.

10. The pressure regulator as claimed in claim 9, wherein the gas releasing assembly has
- a gas releasing tube mounted in the gas releasing orifice and having a drilled hole formed transversely therethrough;
- a gas releasing piston mounted in the gas releasing tube, selectively closing the communication between the drilled hole of the gas releasing tube and the low-pressure chamber; and
- a gas releasing elastic element clamped between the gas releasing piston and an internal surface of the gas releasing tube, pushing the gas releasing piston towards the low-pressure chamber so that the gas releasing piston is attached to a bump formed at the internal surface of the gas releasing tube between the low-pressure chamber and the gas releasing orifice.

11. A gas storage device having the pressure regulator as claimed in claim 1 comprising:
- a gas storage unit having an opening;
- the pressure regulator disposed at the opening of the gas storage unit;
- the first internal tube mounted in the gas storage unit;
- the second internal tube mounted in the gas storage unit;
- the high-pressure piston chamber disposed in the gas storage unit correspondingly;
- the radial part formed transversely through the external tube-, communicating with the axial part and further communicating with an outside of the gas storage unit; and
- the high-pressure piston chamber communicating with an outside of the gas storage unit through the high-pressure exhaustion channel.

* * * * *